March 21, 1944. E. J. EISNER 2,344,684

WEIGHING SCALE

Filed Oct. 28, 1941 2 Sheets-Sheet 1

INVENTOR.
Edwin J. Eisner
BY
ATTORNEY.

March 21, 1944.  E. J. EISNER  2,344,684

WEIGHING SCALE

Filed Oct. 28, 1941  2 Sheets-Sheet 2

INVENTOR.
Edwin J. Eisner
BY
ATTORNEY.

Patented Mar. 21, 1944

2,344,684

UNITED STATES PATENT OFFICE 2,344,684

WEIGHING SCALE

Edwin J. Eisner, Kansas City, Mo., assignor to Apex Scale & Manufacturing Company, Kansas City, Mo., a corporation of Missouri Application October 28, 1941, Serial No. 416,780

2 Claims. (Cl. 265—68)

This invention relates to weighing scales and particularly, attachable heads for the conventional beam type scale, whereby the same may be converted into an easily readable dial scale without an objectionable amount of expense, alteration or change of mode of operation.

One of the important aims of the instant invention is the provision of a weighing scale of the aforementioned character, wherein is incorporated novel and effective means for dampening the vibrations of the scale indicator and all other parts of the head.

A still further aim of this invention is to provide rugged, durable, unitary, attachable mechanism for beam type scales that may be manufactured and assembled as a single piece of equipment and thereafter shipped and installed without the use of special tools or skilled labor.

The manner of disposing the component parts of the head, embodying this invention, constitutes minor objects thereof, and such will appear during the course of the following specification, referring to the accompanying drawings wherein.

Figure 1:
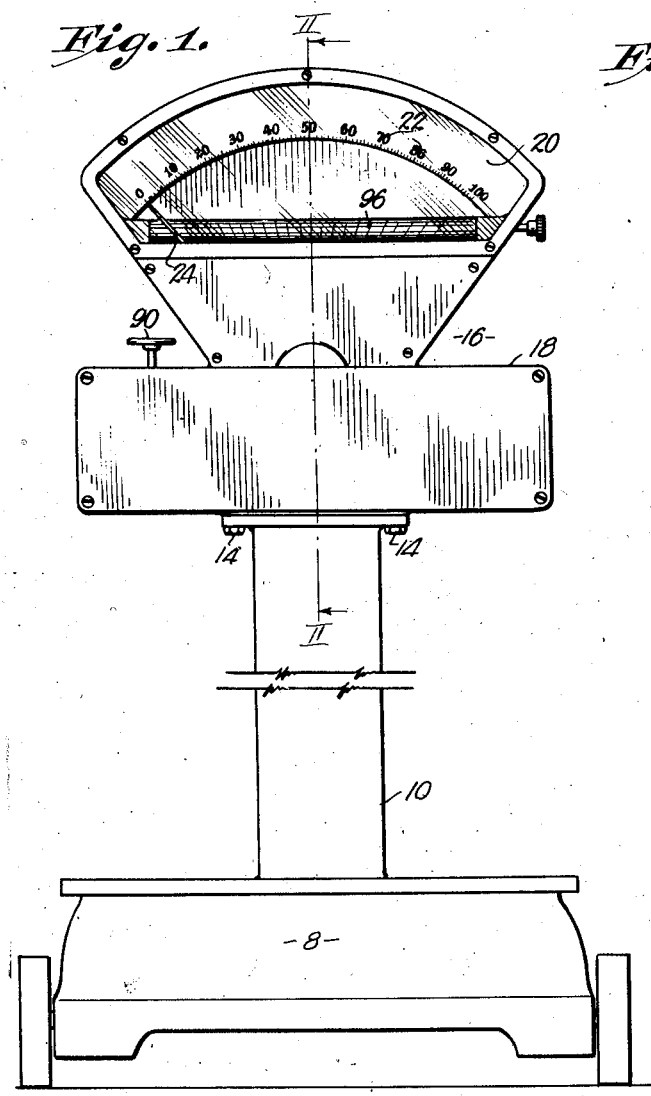
Fig. 1 is a front elevational view of a scale having as a part thereof, the head embodying this invention.
Figure 2:
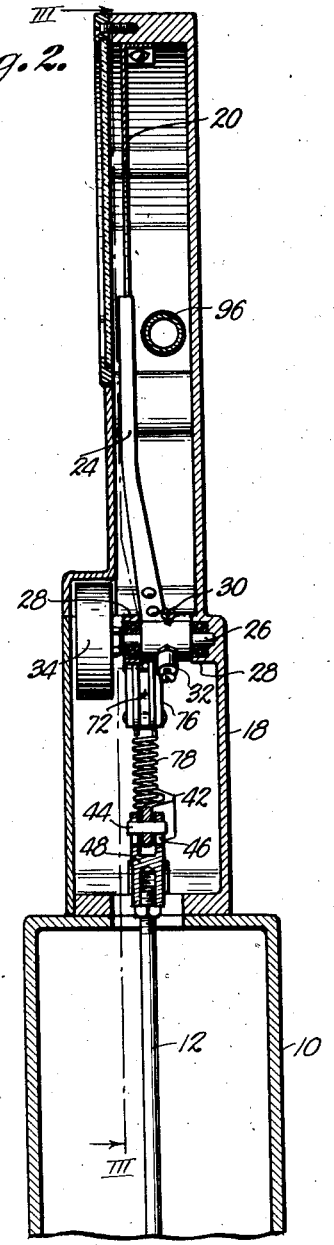
Fig. 2 is an enlarged fragmentary detailed sectional view through a portion of the scale shown in Fig. 1, taken on line II—II thereof.
Figure 5:
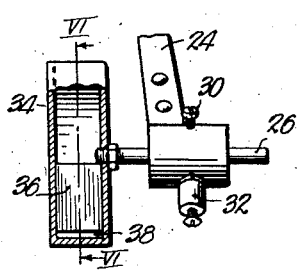
Fig. 5 is an enlarged fragmentary detailed view illustrating the mechanism employed for dampening the vibrations of certain parts of the scale.
Figure 6:
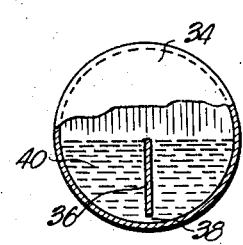
Fig. 6 is a detailed view taken on line VI—VI of Fig. 5.

Having the illustrated embodiment of the present invention to view, it will become apparent to those skilled in the art that the head, capable of converting a beam type scale into a dial type scale, may readily be assembled with a beam type scale that is generally designated by the numeral 8, and which has a hollow column 10 through which passes draw rod 12.

With the beam type scale stripped of all parts above the upper end of column 10 and draw rod 12, the head clearly shown in Figs. 1 to 4 inclusive, may be moved to place and there secured to the upper end of column 10 by bolts or analogous means 14. When such disposition is made of the unitary head, designated in its entirety by the numeral 16, it remains only for the installer to interconnect one of the arms of head 16 in a manner to be hereinafter more fully set down.

The preferred embodiment of the invention comprises a frame 18, molded or otherwise constructed in the form of a housing to receive the hereinafter described component parts of head 16.

This housing has an arcuate surface 20 upon which is marked indicia 22 and across the path of disposition of which travels the free end of indicator 24. This indicator is pivotally mounted through the intermediacy of a shaft 26 journalled in bearings 28 integral with frame 18. Indicator 24 is attached to shaft 26 by a screw 30 and a small counterweight 32 is desirably diametrically disposed opposite to indicator 24.

Shaft 26 rotates with indicator 24 and to dampen the vibrations thereof, a reservoir 34 is employed. This reservoir is a closed end, cylindrical part, having a baffle 36 therein. Baffle 36 extends radially within reservoir 34 to one side of the axis of rotation thereof and terminates in spaced relation to the inner face of the arcuate wall of reservoir 34 to form an equalizing orifice 38 for liquid 40 therein.

Figure 3:
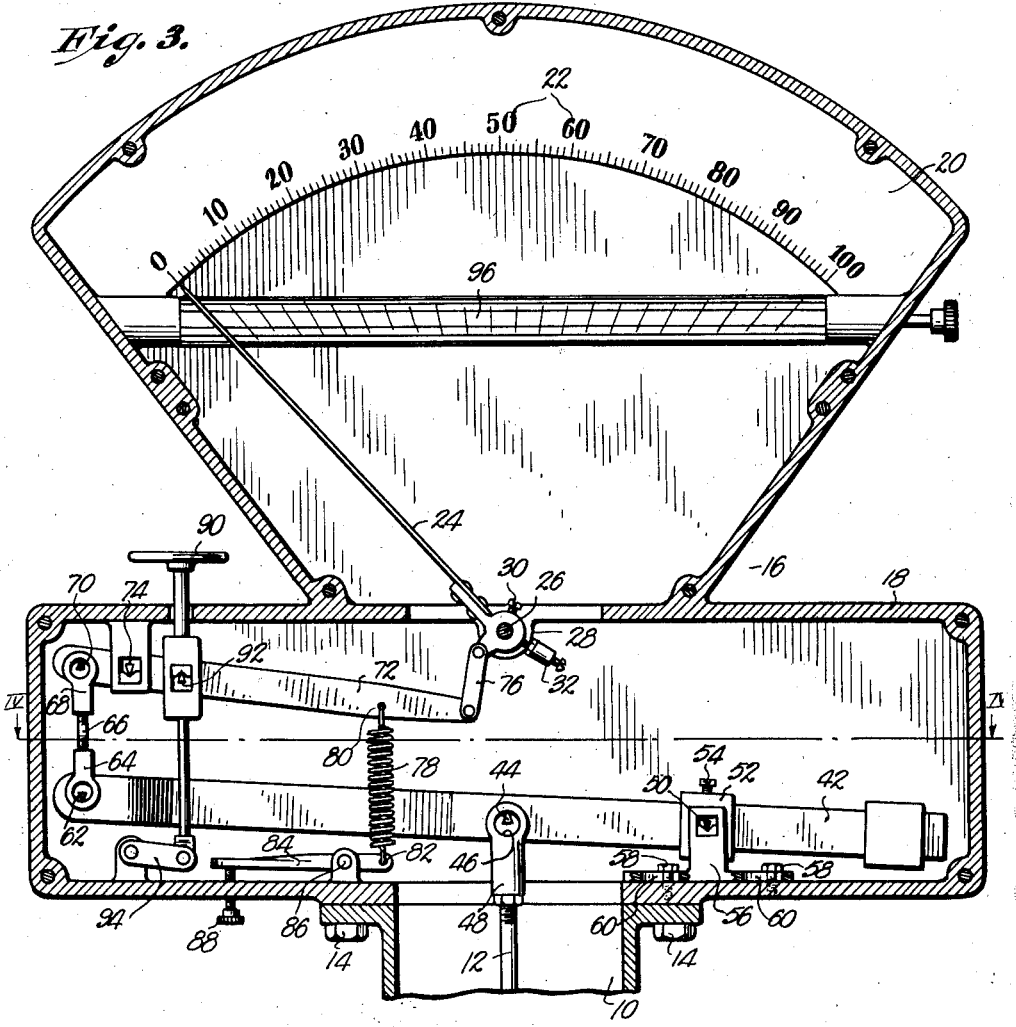
Fig. 3 is a sectional view taken on line III—III of Fig. 2.
Figure 4:
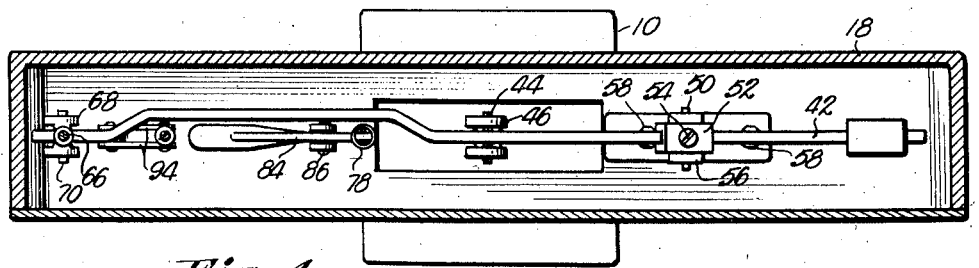
Fig. 4 is a cross sectional view taken on line IV—IV of Fig. 3.

Structure of unique nature is used to interconnect draw rod 12 and indicator 24, and in view of conditions to be met by installations in the field, this structure is equipped with a number of adjustable parts. The component elements of this interconnecting structure are best seen in Fig. 3 of the drawings, and comprise an arm 42 provided with a fulcrum 44 near its medial point, which fulcrum passes transversely through arm 42 to enter the loops 46 on fitting 48 that is on the upper end of rod 12.

Arm 42 has a fulcrum 50 intermediate the substantially central fulcrum 44 and one end thereof that is slidably mounted through the medium of block 52 held in a predetermined position by screw 54. An adjustable fulcrum stand 56 carried directly on frame 18 is movable longitudinally of arm 42 because bolts 58 pass through slots 60 in bearing 56 to permit such manipulation.

The other end of arm 42 has a fulcrum of conventional form 62 in engagement with clevis 64 forming a part of link 66. Another clevis 68 of like nature receives fulcrum 70 extending transversely through one end of lever 72. This lever 72 is pivoted to frame 18 by fulcrum 74 disposed intermediate the ends of said lever and the end thereof opposite from fulcrum 70 is joined to indicator 24 by links 76.

A coil spring 78 has one end thereof secured to lever 72 as at 80 while the other end 82 thereof is in connection with member 84. This member 84 is pivotally supported as at 86 between the ends thereof and an adjusting screw 88 mounted in frame 18 extends exteriorly of the frame to a point where the operator may readily manipulate the same to vary the tension of spring 78. This adjustment permits setting indicator 24 at zero.

A weight platform 90 is likewise disposed exteriorly of the housing formed by frame 18. This weight platform sets upon a fulcrum 92 carried by lever 72 between fulcrum 74 and links 76. A stabilizing link 94 is employed and when the scale is to be used for materials weighing over 100 lbs., the appropriate weights may be placed upon platform 90.

A rate indicator 96 has been shown as a part of head 16, but since the same constitutes a non-essential element of the combination embodying the concepts of this invention, no further explanation of the same will be made.

Obviously, when a beam type scale is converted into a dial type through the employment of mechanism just above described, the change may be made without difficulty and at a relatively low cost. Such changes and modifications as come within the concepts of the invention may be made without departing from the scope of the appended claims.

Having thus described the invention, what is claimed as new and desired to be secured by Letters Patent is:

1. In a scale of the character described, having a draw rod, a weight indicating head comprising a supporting frame provided with indicia; a pivotally mounted indicator movable across the indicia upon actuation of the draw rod; and structure interconnecting the rod and said indicator, said structure being housed by said frame and removable as a unit therewith from the remaining parts of the scale, said structure including an arm pivoted near its medial point to the rod, a fulcrum between one end of the arm and said pivot, a lever pivoted intermediate its ends to the frame, a link joining the other end of said arm and one end of the lever, means operably securing the other end of the lever to the indicator, and a weight-receiving platform on the lever between its pivotal connection and the said other end thereof, said platform extending exteriorly of the frame.

2. In a scale of the character described, having a draw rod, a weight indicating head comprising a supporting frame provided with indicia; a pivotally mounted indicator movable across the indicia upon actuation of the draw rod; and structure interconnecting the rod and said indicator, said structure being housed by said frame and removable as a unit therewith from the remaining parts of the scale, said structure including an arm pivoted near its medial point to the rod, a fulcrum between one end of the arm and said pivot, a lever pivoted intermediate its ends to the frame, a link joining the other end of said arm and one end of the lever, means operably securing the other end of the lever to the indicator a weight receiving platform on the lever between its pivotal connection and the said other end thereof, a spring having one end secured to the lever between the platform and the said other end thereof, and adjustable means for anchoring the other end of the spring to the frame.

EDWIN J. EISNER.